(12) United States Patent
Ohba

(10) Patent No.: US 10,275,021 B2
(45) Date of Patent: Apr. 30, 2019

(54) DISPLAY APPARATUS OF FRONT-OF-THE-EYE MOUNTED TYPE

(71) Applicant: Sony Interactive Entertainment Inc., Tokyo (JP)

(72) Inventor: Akio Ohba, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/155,194

(22) Filed: May 16, 2016

(65) Prior Publication Data
US 2016/0349839 A1 Dec. 1, 2016

(30) Foreign Application Priority Data

May 27, 2015 (JP) .................................. 2015-107815

(51) Int. Cl.
*G06F 3/01* (2006.01)
*G02B 27/01* (2006.01)
*G06F 3/03* (2006.01)
*G06F 3/16* (2006.01)

(52) U.S. Cl.
CPC ........... *G06F 3/012* (2013.01); *G02B 27/017* (2013.01); *G02B 27/0172* (2013.01); *G06F 3/013* (2013.01); *G06F 3/017* (2013.01); *G06F 3/0304* (2013.01); *G06F 3/16* (2013.01); *G02B 27/0176* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| 7,365,766 B1* | 4/2008 | Lapalme .................. H04N 7/18 348/61 |
| 7,369,991 B2 | 5/2008 | Manabe |
| 8,922,481 B1 | 12/2014 | Kauffmann |
| 2003/0171921 A1 | 9/2003 | Manabe |

(Continued)

FOREIGN PATENT DOCUMENTS

| JP | 2003255993 A | 9/2003 |
| JP | 2013175929 A | 9/2013 |

(Continued)

OTHER PUBLICATIONS

Notification of Reason for Refusal for corresponding JP Application No. 2015-107815, 9 pages, dated Sep. 18, 2018.

(Continued)

*Primary Examiner* — Benjamin C Lee
*Assistant Examiner* — Krishna P Neupane
(74) *Attorney, Agent, or Firm* — Matthew B. Dernier, Esq.

(57) ABSTRACT

The present disclosure provides a display apparatus of front-of-the-eye mounted type having a camera configured to image portions around the mouth of a user. The display apparatus of front-of-the-eye mounted type includes an around-the-mouth imaging camera arranged at a position where it is practicable to image a mouth movement of a user; and a display control unit configured to display an image based on input information of the user estimated from the mouth movement imaged by the around-the-mouth imaging camera.

4 Claims, 7 Drawing Sheets

(56) References Cited

U.S. PATENT DOCUMENTS

| | | | |
|---|---|---|---|
| 2005/0083248 A1* | 4/2005 | Biocca | A41D 31/0088 345/8 |
| 2015/0324168 A1 | 11/2015 | Suzuki | |
| 2016/0035351 A1* | 2/2016 | Sendai | G02B 27/017 704/275 |
| 2016/0203359 A1* | 7/2016 | von und zu Liechtenstein | G06K 9/00335 345/156 |

FOREIGN PATENT DOCUMENTS

| | | |
|---|---|---|
| JP | 2014021707 A | 2/2014 |
| JP | 2014132396 A | 7/2014 |
| JP | 2015028654 A | 2/2015 |

OTHER PUBLICATIONS

Takaaki Kuratate, Principal components based lip countour extraction from head-mounted camera and cross subject facial animation, research report by Information Processing Society of Japan, Information Processing Society of Japan, vol. 2000, No. 78, pp. 79-84 (CS-NG-2002-00011-013), (Sep. 8, 2000) (for relevance see Notification of Reason for Refusal for corresponding JP Application No. 2015-107815.

* cited by examiner

DISPLAY APPARATUS OF FRONT-OF-THE-EYE MOUNTED TYPE

BACKGROUND

The present disclosure relates to a display apparatus of front-of-the-eye mounted type.

Display apparatuses of front-of-the-eye mounted type, such as head mounted displays which are used to be mounted on the head of a user using the display are developed. For one of user input methods for using a display apparatus of front-of-the-eye mounted type, voice input requiring no input interface such as a keyboard or a manual operation is useful. However, it is difficult to use a voice input method at public places where it is limited to utter voice or places where it is difficult to pick up sound due to the surrounding noise. In addition, for those users who don't want to utter voice, a voice input method is not recommended.

Therefore, a configuration in which a keyword to be entered by a user can be estimated from the voiceless movement of the user enhances user convenience. To realize this configuration, it is necessary to take an image of the movement of the mouth of a user with a camera or the like, but it is difficult to accurately take an image of the portions around the mouth if the head of the user makes a movement or the user himself or herself makes a movement.

SUMMARY

Therefore, the present disclosure addresses the above-identified and other problems associated with related-art methods and apparatuses and solves the addressed problems by providing a display apparatus of front-of-the-eye mounted type having a camera capable of taking an image of the portions around the mouth of user.

In carrying out the disclosure and according to one embodiment thereof, there is provided a display apparatus of front-of-the-eye mounted type. This display apparatus of front-of-the-eye mounted type includes an around-the-mouth imaging camera arranged at a position where it is practicable to image a mouth movement of a user; and a display control unit configured to display an image based on input information of the user estimated from the mouth movement imaged by the around-the-mouth imaging camera.

The above-mentioned display apparatus of front-of-the-eye mounted type further has an around-the-eye imaging camera arranged at a position where it is practicable to image expression around the eyes of the user. In this configuration, the display control unit displays an image based on input information of the user estimated from the mouth movement imaged by the around-the-mouth imaging camera and the expression around the eyes imaged by the around-the-eye imaging camera.

In the above-mentioned display apparatus of front-of-the-eye mounted type, the around-the-eye imaging camera is capable of detecting a sight line of the user and the display control unit displays an image based on the mouth movement, the around-the-eye expression, and information related with a sight line of the user detected by the around-the-eye imaging camera.

The above-mentioned display apparatus of front-of-the-eye mounted type further has a microphone configured to pick up voice uttered by said user.

DETAILED DESCRIPTION OF THE PREFERRED EMBODIMENT

The disclosure disclosed herein will be described in further detail by way of embodiment thereof with reference to the accompanying drawings. In the present embodiment, an example in which a head mounted display is used as a display apparatus of front-of-the-eye mounted type is described.

Figure 1:
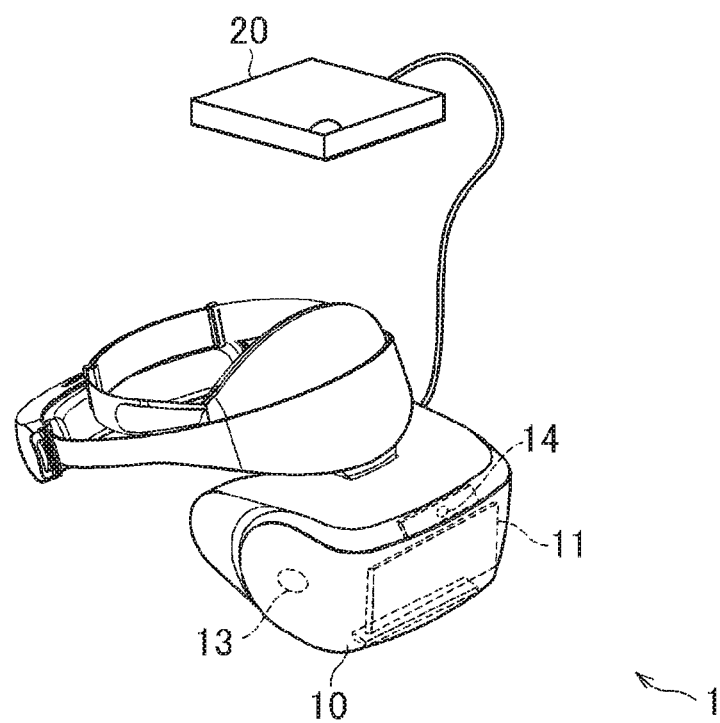
FIG. 1 is an external view illustrating a head mounted display related with one embodiment of the present disclosure.

Now, referring to FIG. 1, there is shown an example of an overall configuration of an information processing system 1 related with the present embodiment. As shown in FIG. 1, the information processing system 1 related with the present embodiment has a head mounted display 10 and an information processing apparatus 20. The head mounted display 10 and the information processing apparatus 20 are interconnected via wired or wireless communication unit for executing communication with each other.

The head mounted display 10 is a display apparatus of front-of-the-eye mounted type that, mounted on the head of a user, presents still images and image such as moving images to the user through a display device arranged therein and has a control block providing a program control device such as a CPU (central processing unit) operating as instructed by programs installed in the head mounted display 10, a storage block that is a storage element such as ROM (read-only memory) or RAM (random-access memory) and a hard disk drive for example, and a communication block that is a communication interface such as a network board. The head mounted display 10 related with the present embodiment displays, on a display block 11, an image indicated by output information received from the information processing apparatus 20.

The information processing apparatus 20 is a game apparatus or a computer, for example, and has a control block providing a program control device such as a CPU operating as instructed by programs installed in the information processing apparatus 20, a storage block that is a storage element such as ROM or RAM and a hard disk drive for example, and a communication block that is a communication interface such as a network board. The information processing apparatus 20 related with the present embodiment transmits output information indicative of the image generated by the execution of installed programs to the head mounted display 10, for example.

The head mounted display 10 related with the present embodiment is mounted on the head of a user and presents a three-dimensional image to the user by use of the display block 11 arranged in the head mounted display 10. It should be noted that the head mounted display 10 is also capable of presenting a two-dimensional image. The head mounted display 10 is made up of the display block 11, a first imaging unit 13, and a second imaging unit 14.

The display block 11 is a display device such as a liquid crystal display or an organic EL (electroluminescence) display, for example, and arranged so as to be positioned in front of both eyes of a user when the head mounted display 10 is mounted on the user. In the right side region of the display block 11 located in front of the right eye of a user, the image for the right eye is displayed; in the left side region of the display block 11 located in front of the left eye of the user, the image for the left eye is displayed. It should be noted that the right-side region and the left-side region of the display block 11 may be each configured as a separate display block 11.

The first imaging unit 13 (or an around-the-mouth imaging camera) is an imaging element such as CCD (charge-coupled device) image sensor, CMOS (complementary metal oxide semiconductor) image sensor, or an infrared imaging sensor and arranged so as to take an image of the movement of the mouth of a user when the head mounted display 10 is mounted on the user.

Figure 2:
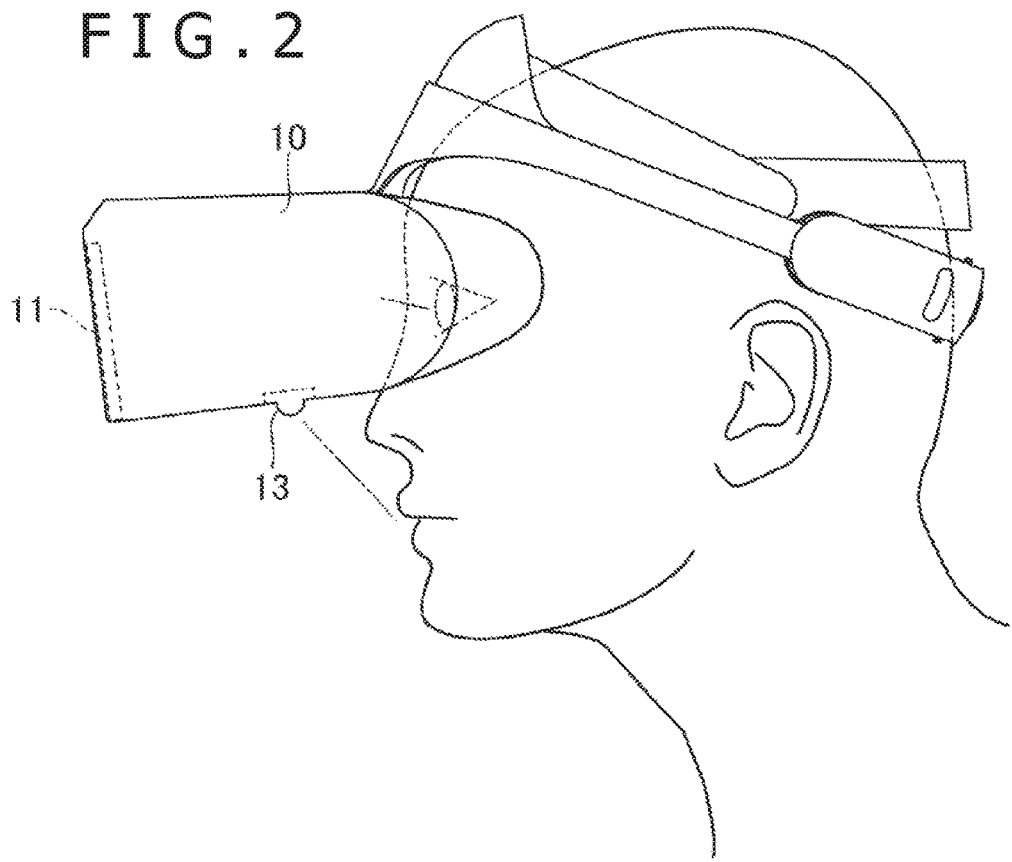
FIG. 2 is a schematic diagram illustrating an example of a first imaging unit installed on the head mounted display shown in FIG. 1.

Referring to FIG. 2, there is shown one example of the first imaging unit 13 that is arranged on the head mounted display 10 related with the present embodiment. As shown in FIG. 2, the first imaging unit 13 is arranged on the bottom surface of the housing of the head mounted display 10 mounted on a user such that the first imaging unit 13 is directed to the outside. Consequently, when the head mounted display 10 is mounted on the user, the first imaging unit 13 can take an image around the mouth of the user located downward from the bottom surface of the housing of the head mounted display 10. In addition, arranging the first imaging unit 13 at an angle so that the first imaging unit 13 is directed to the mouth of the user when the head mounted display 10 is mounted on the user makes it easy to take an image around the mouth of the user.

Figure 3:
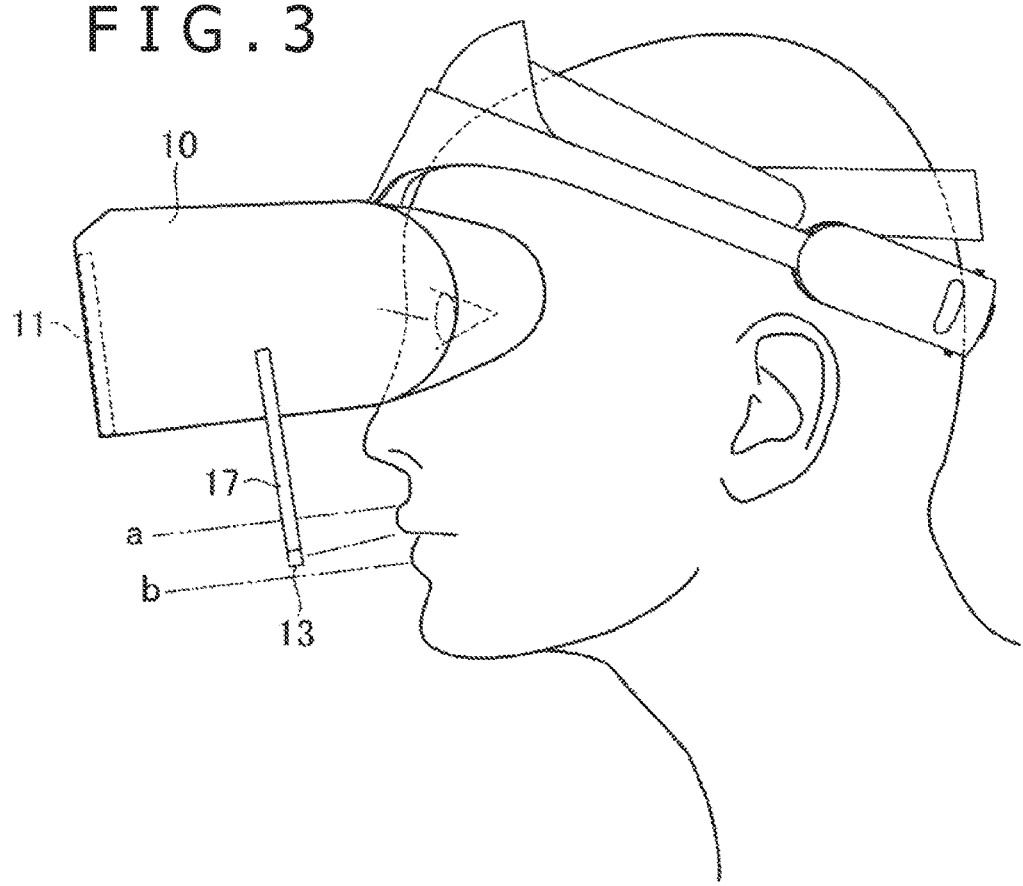
FIG. 3 is a schematic diagram illustrating another example of the first imaging unit installed on the head mounted display shown in FIG. 1.

Referring to FIG. 3, there is shown another example of the first imaging unit 13 arranged on the head mounted display 10 related with the present embodiment. As shown in FIG. 3, the first imaging unit 13 is arranged on the open end of a flexible shaft 17. The other end of the flexible shaft 17 is supported by the housing (at a left surface, a right surface, a bottom surface, a top surface, or a front surface) of the head mounted display 10. The flexible shaft 17 extends downward from the bottom surface of the housing of the head mounted display 10 with the head mounted display 10 mounted on the user. This allows the first imaging unit 13 to take an image around the mouth of the user located downward from the bottom surface of the housing of the head mounted display 10 when the head mounted display 10 is mounted on the user. In addition, the flexible shaft 17 has flexibility, so that the flexible shaft 17 may be deformed such that the first imaging unit 13 is arranged at a location suitable to take an image of a movement of the mouth of the user. Namely, bending the flexible shaft 17, the user is able to finely adjust the arrangement of the first imaging unit 13. It should be noted that the flexible shaft 17 may have, at the open end thereof, a microphone unit for picking up the voice uttered by a user, in addition to the first imaging unit 13.

Shown in FIG. 3 is an example in which the first imaging unit 13 is located in front of the mouth of a user. The location of the first imaging unit 13 in front of the user's mouth is advantageous that it facilitates the imaging of the portions around the user's mouth. On the other hand, the location of the first imaging unit 13 in front of the user's mouth may dirt the first imaging unit 13 with the saliva and the like of the user, thereby possibly disabling the imaging of fine moving images. In order to circumvent such a problem, it is more desirable that the first imaging unit 13 is arranged at a position that is offset from the front of the user's mouth when the head mounted display 10 is mounted on the user. To be more specific, as shown in FIG. 3 for example, a range from a position a that is the position of the upper lip of the user to a position b that is the position of the lower lip of the user as viewing the side of the head mounted display 10 is assumed as the front of the mouth. At this time, the flexible shaft 17 may be arranged such that the first imaging unit 13 is positioned in the range above the position a (from the bottom surface of the head mounted display 10 to the position a) or the range below the position b. It should be noted that the position a and the position b are illustrative only; these positions may be each at a predetermined distance from the center of the mouth or a position indicative of the front of the mouth determined by the size of the faces of general persons.

Figure 4:
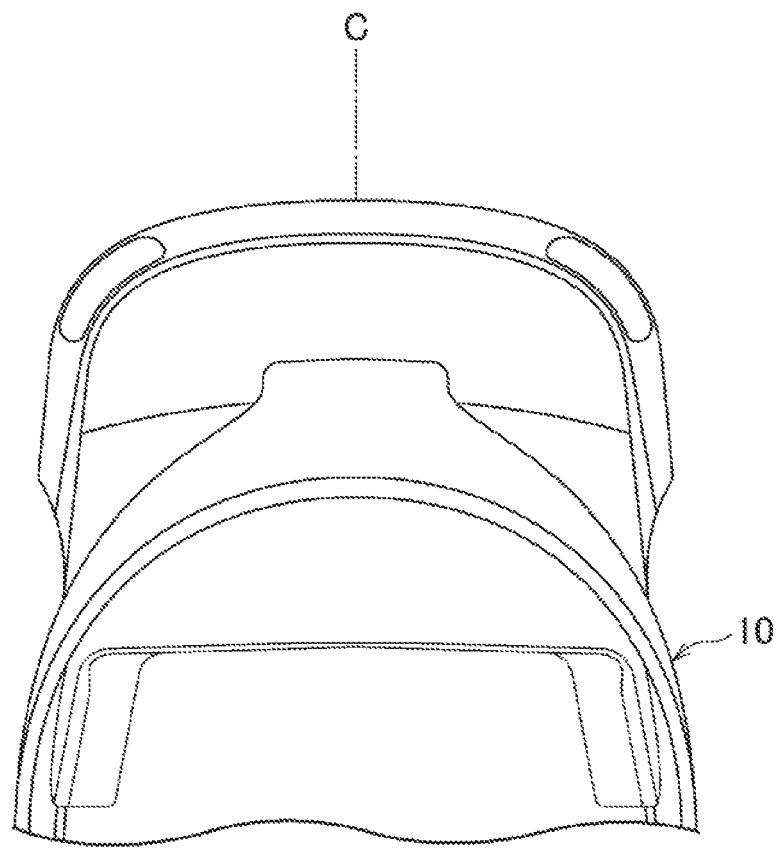
FIG. 4 is a top view illustrating the head mounted display shown in FIG. 1.

Next, referring to FIG. 4, there is shown a top view illustrating the head mounted display 10 related with the present embodiment. As shown in FIG. 4, a position c that is the center of the head mounted display 10 in the case where the top of the head mounted display 10 is viewed is assumed to be the front of the user's mouth. At this time, it can also be assumed that the flexible shaft 17 be arranged such that the first imaging unit 13 is positioned in the range in the left direction from the position c or the range in the right direction from the position c which are offset from the position c that is the center of the head mounted display 10. It should be noted that the position c is illustrative only and therefore the range at a predetermined distance in the left and right directions from position c that is the center of the head mounted display 10, for example, is assumed to be the front of the user's mouth. In this case, the flexible shaft 17 may be arranged such that the first imaging unit 13 is positioned at a position offset from the range concerned in the left or right direction.

It should be noted that positioning a microphone unit also in the front of the user's mouth may easily dirt the microphone unit with user's saliva or the like, thereby deteriorating the sensitivity of sound pickup. Therefore, like the first imaging unit 13, it is desirable for the microphone unit to be arranged at a position offset from the front of the user's mouth.

Further, if both the microphone unit and the first imaging unit 13 are arranged and user input based on the movement of the user's mouth is mainly used, then positioning the first imaging unit 13 in the front side of the mouth relative to the microphone unit allows the first imaging unit 13 to image portions around the user's mouth more easily. On the other hand, if voice input is mainly used, positioning the microphone unit in the front side of the mouth relative to the first imaging unit 13 allows the microphone unit to pick up the voice uttered by the user more easily.

Thus, arranging the first imaging unit 13 on the head mounted display 10 such that the first imaging unit 13 can image portions around the user's mouth allows the first imaging unit 13 to image the movement of the user's mouth accurately even if the head of the user or the user himself or herself makes a movement.

The second imaging unit 14 (the around-the-eye imaging camera) is an imaging element such as CCD image sensor, CMOS image sensor, or infrared image sensor and arranged so as to image portions around the eyes of a user when the head mounted display 10 is mounted on the user.

Figure 5:
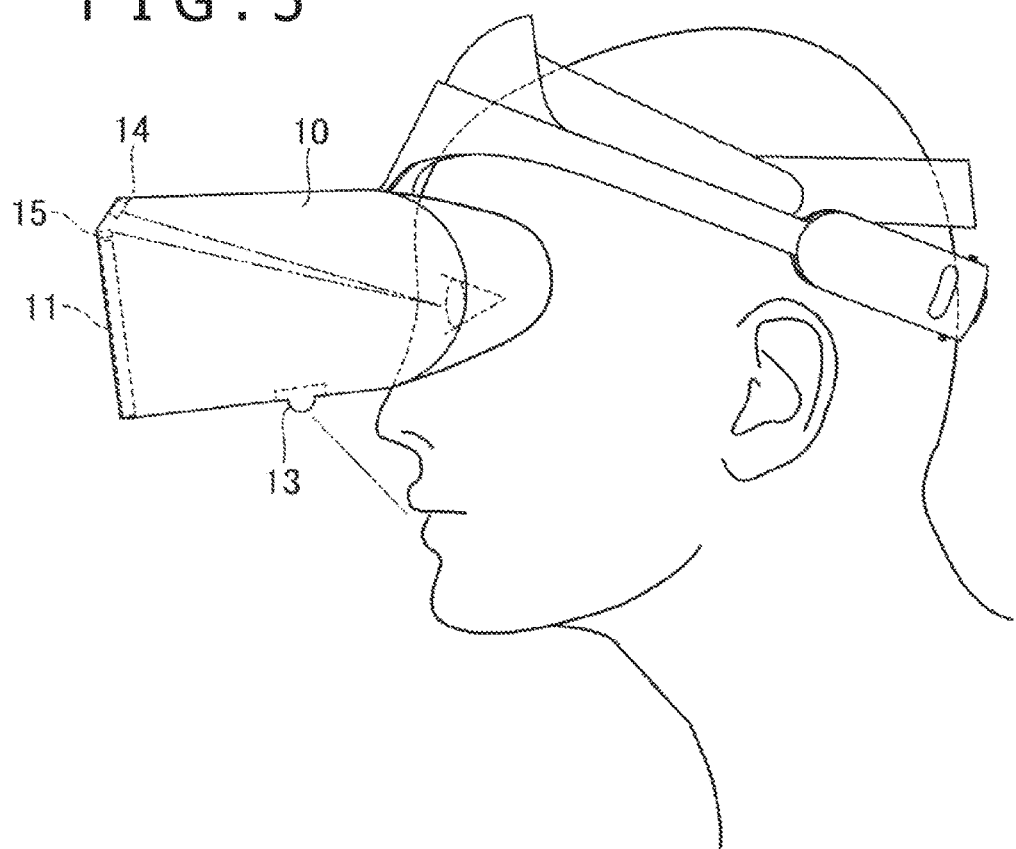
FIG. 5 is a schematic diagram illustrating an example of a second imaging unit and an infrared LED (light-emitting diode) installed on the head mounted display shown in FIG. 1.

Referring to FIG. 5, there is shown one example of the second imaging unit 14 and an infrared LED 15 that are arranged on the head mounted display 10 related with the present embodiment. As shown in FIG. 5, the second imaging unit 14 and the infrared LED 15 are arranged as opposed to the display block 11 inside the housing of the head mounted display 10 when the head mounted display 10 is mounted on the user. The arrangement allows the infrared LED 15 to radiate an infrared ray to around the user's eyes located in the direction opposite to the display block 11 when the head mounted display 10 is mounted on the user. Then, imaging the reflected infrared ray by the second imaging unit 14 allows the second imaging unit 14 to image portions around the user's eyes when the head mounted display 10 is mounted on the user. In addition, using change in the direction and quantity of the reflected infrared ray due to eyeball movement or blinking frequency allows the detection of user's sight direction, pupil movement, blinking count or frequency, for example.

It should be noted that FIG. 5 shows an example in which the second imaging unit 14 and the infrared LED 15 are arranged above the display block 11; however, if the second imaging unit 14 and the infrared LED 15 are arranged at positions that allow imaging of both the eyes of the user, the above-mentioned arrangement is not limited to this example. For example, the second imaging unit 14 and the infrared LED 15 may be arranged under, to the left or to the right of the display block 11 or on the side relative to the user sight line (or in the direction of the display block 11) in the housing of the head mounted display 10. Further, the second imaging unit 14 may include a left-eye imaging section and a right-eye imaging section for separately imaging both eyes of the user. In this case, the second imaging unit 14 may only include one of the left-eye imaging section and the right-eye imaging section.

Generally, utterance by a user causes opening and closing of the jaw and shape changes in lips, tongue, cheeks, and eyes. Detecting such face feature information indicative of user facial expressions at the utterance by the user as mouth movement, eye shape, and shape of skins around the eyes by the first imaging unit 13 and the second imaging unit 14 arranged on the head mounted display 10 allows the estimation of a keyword the user wants to utter even in the case where the user does not actually utter aloud. The following describes keyword estimation processing based on user facial feature information.

Figure 6:
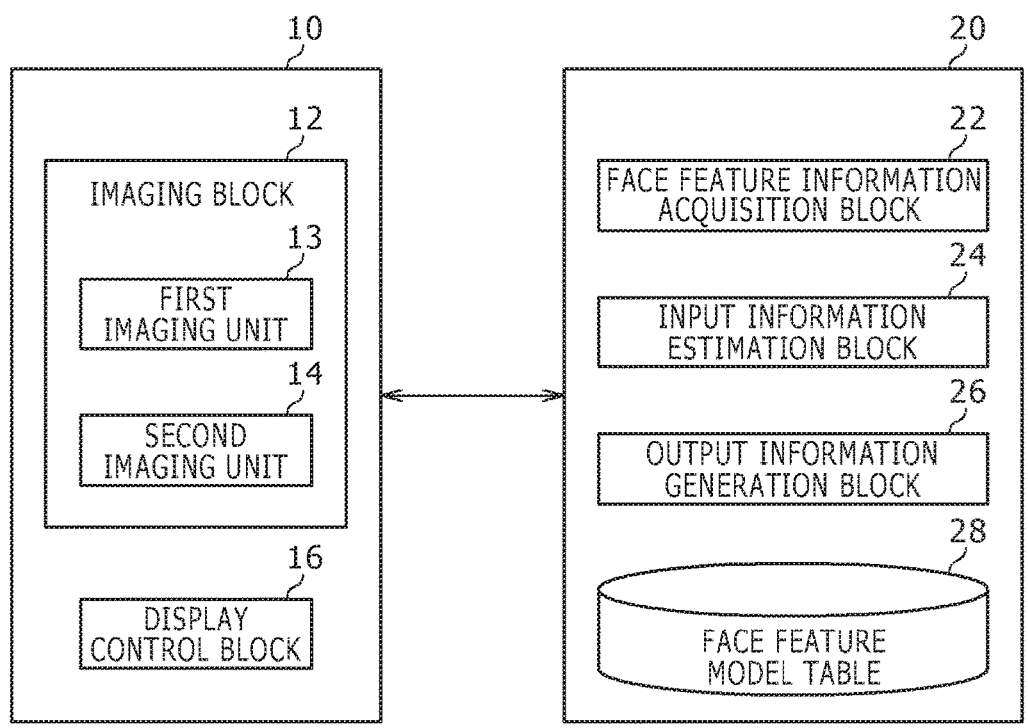
FIG. 6 is a functional block diagram illustrating an example of functions that are realized by the head mounted display and an information processing apparatus shown in FIG. 1.

Referring to FIG. 6, there is shown a functional block diagram illustrating functions to be realized by the head mounted display 10 and the information processing apparatus 20 related with the present embodiment. As shown in FIG. 6, the head mounted display 10 related with the present embodiment has an imaging block 12 including the first imaging unit 13 and the second imaging unit 14 and a display control block 16. These functions are realized by executing programs stored in the storage block by the control block. These programs may be provided by being stored in various types of computer-readable information storage media, such as optical disks, or via a communication network, such as the Internet.

The information processing apparatus 20 has a face feature information acquisition block 22, an input information estimation block 24, an output information generation block 26, and a face feature model table 28. Of these functions, the face feature information acquisition block 22, the input information estimation block 24, and the output information generation block 26 are realized by executing programs stored in the storage block by the control block. These programs may be provided by being stored in various types of computer-readable information storage media, such as optical disks, or via a communication network, such as the Internet. The face feature model table 28 is realized by the storage block.

The imaging block 12 of the head mounted display 10 takes moving images of the face of a user with the head mounted display 10 mounted on the user. In the present embodiment, the imaging block 12 includes the first imaging unit 13 for imaging portions around the user's mouth and the second imaging unit 14 for imaging portions around the user's eyes.

The display control block 16 of the head mounted display 10 gets information held in the storage block of the head mounted display 10 and output information generated by the output information generation block 26 of the information processing apparatus 20 and displays the acquired information onto the display block 11.

The face feature information acquisition block 22 of the information processing apparatus 20 gets face feature information of the user from a user face moving image transmitted from the head mounted display 10. Here, the face feature information acquisition block 22 gets, as the face feature information, the around-the-mouth feature information of the user extracted from a moving image taken by the first imaging unit 13 of the head mounted display 10 and around-the-eye feature information of the user extracted from a moving image taken by the second imaging unit 14 of the head mounted display 10. The around-the-mouth feature information includes information indicative of the contour of the lips such as the width and height of the lips and information indicative of distribution of color components, the distribution of chroma, and the distribution of brightness included in the taken image. The around-the-eye feature information includes information indicative of the contour of the eyes such as the width and height of the eyes and information indicative of distribution of color components, the distribution of chroma, and the distribution of brightness included in the taken image. In addition, the around-the-eye feature information may be information associated with such user sight line as sight line direction and blinking count.

The input information estimation block 24 of the information processing apparatus 20 estimates a keyword (or user input information) that the user intended to utter from the user face feature information acquired by the face feature information acquisition block 22.

The following specifically describes the processing of estimating the user input information from user face feature information to be executed by the input information estimation block 24 of the information processing apparatus 20. In the present embodiment, the user input information is estimated by matching the user face feature information (here, around-the-mouth feature information) acquired by the face feature information acquisition block 22 with a face feature model stored in the face feature model table 28 of the information processing apparatus 20. For a face feature information matching method, known techniques such as DP (dynamic programming) or HMM (hidden Markov model) are available. For example, the face feature model table 28 of the information processing apparatus 20 stores face feature models obtained by learning from the face feature information of many persons associated with two or more keyword candidates (phoneme, syllable, or word). Here, voice data uttered by many persons and moving images of faces at the time of the utterance are collected in advance, HMM of each keyword is learned by use of a known learning algorithm such as EM (expectation maximization) algorithm from the face feature information extracted from the face moving images, and the learned results are stored in the face feature model table 28. For the face feature models to be listed in the face feature model table 28 of the information processing apparatus 20, a mouth shape model indicative of mouth shapes formed when uttering vowel "a," vowel "i," vowel "u," vowel "e," and vowel "o" and a mouth shape model indicative of mouth shapes to be formed when uttering consonants with a phoneme used as the unit of keyword are listed, for example. Then, the input information estimation block 24 estimates, as user input information, a word configured by linking, in a time sequence, keyword candidates corresponding to a face feature model highest in similarity with the user face feature information acquired by the face feature information acquisition block 22. For a face feature model, a mouth shape model may be listed that is indicative of mouth shapes formed to utter words with a word used as the unit of keyword. In this case, the input information estimation block 24 also estimates, as user input information, a word corresponding to a face feature model highest in similarity with the user face feature information acquired by the face feature information acquisition block 22. Consequently, a keyword that was not actually uttered but the user wanted to utter can be estimated on the basis of the movement of the user's mouth. It should be noted that it may be assumed that the face feature model table 28 be stored in an external server and keywords be acquired by enquiring the external server by the information processing apparatus 20.

In addition, the input information estimation block 24 may estimate a keyword that the user intended to utter on the basis of information obtained by adding around-the-eye feature information to the face feature information acquired by the face feature information acquisition block 22. In this case, the face feature model table 28 of the information processing apparatus 20 additionally stores, as the face feature model, an around-the-eye shape model indicative of eye shapes formed when uttering vowel "a," vowel "i," vowel "u," vowel "e," and vowel "o" and skin shapes around the eyes. The input information estimation block 24 estimates, as user input information, a word configured by linking, in time sequence, keyword candidates corresponding to a face feature model highest in similarity with the user face feature information (around-the-mouth feature information and around-the-eye feature information) acquired by the face feature information acquisition block 22. Consequently, a keyword that is difficult to be estimated only from mouth shapes can be accurately estimated by adding around-the-eye feature information.

In addition, the input information estimation block 24 may estimate the user input information after restricting keywords that become user input information candidates depending upon situations in which the user enters the user input information. For example, if "the national origin is entered," the keywords that can be entered are restricted to a country name. Thus, in a situation where keywords that can be entered can be estimated to some degree, estimation processing is executed by restricting the keywords that provide user input information candidates, thereby estimating keywords more accurately.

The output information generation block 26 of the information processing apparatus 20 generates output information indicative of video to be displayed on the display block 11 of the head mounted display 10 on the basis of the user input information estimated by the input information estimation block 24 of the information processing apparatus 20. To be more specific, the output information generation block 26 may generate the user input information estimated by the input information estimation block 24 as text information or the output information generation block 26 may generate the image information corresponding to the user input information estimated by the input information estimation block 24.

Figure 7:
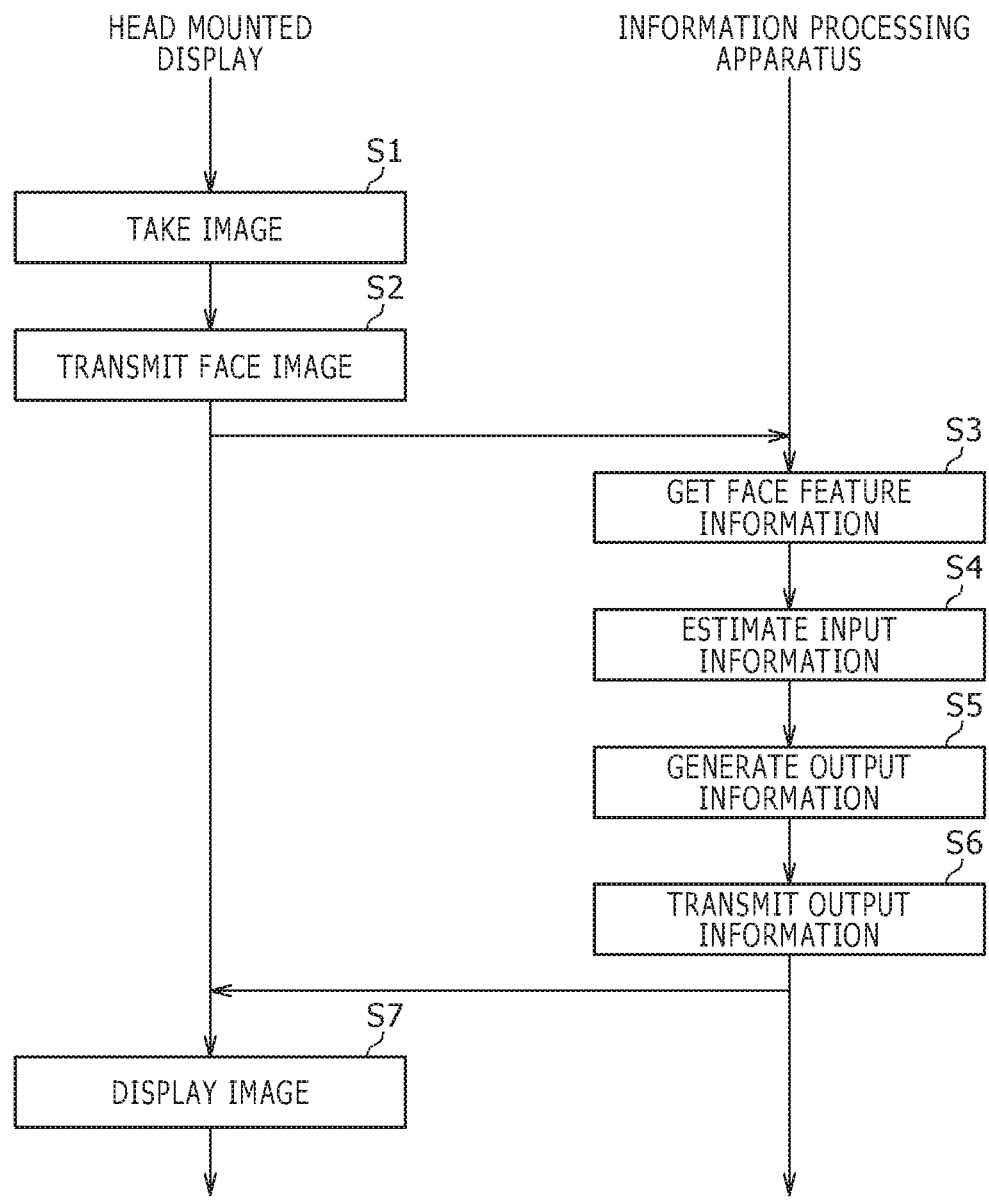
FIG. 7 is a sequence chart indicative of flows of user input information estimation processing that is executed by the head mounted display and the information processing apparatus shown in FIG. 1.

The following describes a flow of user input information estimation processing that is executed by the head mounted display 10 and the information processing apparatus 20 related with the present embodiment, by referring to a sequence chart shown in FIG. 7.

First, when use of the head mounted display 10 is started by mounting the head mounted display 10 on the user for example, the imaging block 12 of the head mounted display 10 starts taking a moving image of the face of the user (S1). Next, frame images included in the taken moving image is transmitted to the information processing apparatus 20 with predetermined time intervals (S2). It should be noted that the frame images included in the taken moving image may also be transmitted to the information processing apparatus 20 with a predetermined time interval such as user's starting an input operation. User's input operation starting timings include the timing of entering text, the timing of operating selection, and the timing of replying a question, for example.

The face feature information acquisition block 22 of the information processing apparatus 20 gets user face feature information from the frame images received from the head mounted display 10 (S3).

The input information estimation block 24 of the information processing apparatus 20 estimates user input information on the basis of the face feature information acquired by the face feature information acquisition block 22 of the information processing apparatus 20 and the face feature model stored in the face feature model table 28 of the information processing apparatus 20 (S4).

The output information generation block 26 of the information processing apparatus 20 generates output information indicative of an image to be displayed on the display block 11 of the head mounted display 10 on the basis of the user input information estimated by the input information estimation block 24 of the information processing apparatus 20 (S5).

Next, when the output information generated by the output information generation block 26 of the information processing apparatus 20 is transmitted to the head mounted display 10 (S6), the display control block 16 of the head mounted display 10 displays, on the display block 11, the image indicated by the output information transmitted from the information processing apparatus 20 (S7).

It should be noted that the present disclosure is not limited to the embodiment mentioned above.

For example, the display control block 16 of the head mounted display 10 may be configured to display, on the display block 11, an image indicative whether portions around the user's mouth can be imaged or not by the first imaging unit 13 when the head mounted display 10 is mounted on the user. To be more specific, when the head mounted display 10 is mounted on the user, the head mounted display 10 determines whether a moving image around the user's mouth including at least the entire user mouth is taken by the first imaging unit 13 or not. Then, the display control block 16 of the head mounted display 10 displays the image, on the display block 11, in accordance with a result of the determination whether a moving image around the mouth is taken by the first imaging unit 13 or not. For example, if a moving image around the mouth is taken, the display control block 16 displays an image indicative that the input based on a mouth movement is enabled; if a moving image around the mouth is not taken, the display control block 16 displays an image indicative of an error. In addition, the display control block 16 may display a setting screen of the head mounted display 10 to make the user set voice input or the input based on mouth movement. It should be noted that the image to be displayed on the display block 11 in accordance with a result of the determination whether a moving image around the mouth is taken by the first imaging unit 13 or not may be generated by the output information generation block 26 of the information processing apparatus 20. In this case, the head mounted display 10 transmits, to the information processing apparatus 20, a result of the determination whether a moving image around the mouth including at least the entire user mouth is taken by the first imaging unit 13 or not. Acquiring the determination result from the information processing apparatus 20, the output information generation block 26 of the information processing apparatus 20 generates output information in accordance with the determination result. Next, the display control block 16 of the head mounted display 10 displays the output information transmitted from the information processing apparatus 20 onto the display block 11. This setup allows the user to recognize whether the input based on mouth movement is enabled or not when the head mounted display 10 is mounted on the user.

Further, the display control block 16 of the head mounted display 10 may display a moving image taken by the first imaging unit 13 onto the display block 11 when the head mounted display 10 is mounted on the user. If the first imaging unit 13 is movably arranged on the head mounted display 10 such as the case in which the first imaging unit 13 is arranged on the open end of the flexible shaft 17 having flexibility, it is difficult to recognize whether portions around the mouth can be imaged or not when the position of the first imaging unit 13 is moved. Therefore, displaying a moving image taken by the first imaging unit 13 onto the display block 11 allows the user to recognize whether portions around the mouth can be imaged and adjust the position of the first imaging unit 13 within a range in which portions around the mouth can be imaged.

In the embodiment mentioned above, user input information is estimated by use of face feature information at the time the user is about to utter. Here, it is practicable to estimate user input information by use of face feature information combined with related-art voice input. To be more specific, voice recognition of voice uttered by the user picked up by the microphone unit and the estimation of user input information based on the user face feature information at the time user utters voice are combined for execution. Specifically, the estimation of user input information based on face feature information may be executed in the case where a word difficult for voice recognition is uttered or voice recognition is difficult due to surrounding noise, for example.

In the embodiment mentioned above, the face feature information acquisition block 22 is included in the information processing apparatus 20. It is also practicable that the face feature information acquisition block 22 is included in the head mounted display 10. To be more specific, in the head mounted display 10, around-the-mouth feature information is acquired from a moving image taken by the first imaging unit 13 and the acquired around-the-mouth feature information is transmitted to the information processing apparatus 20. Next, the input information estimation block 24 of the information processing apparatus 20 acquires the around-the-mouth feature information transmitted from the head mounted display 10 so as to estimate a keyword about to be uttered by the user on the basis of the acquired around-the-mouth feature information. Consequently, the frame images of a moving image taken by the first imaging unit 13 are not transmitted to the information processing apparatus 20, so that the communication band between the head mounted display 10 and the information processing apparatus 20 can be saved. Likewise, the head mounted display 10 may acquire around-the-eye feature information from a moving image taken by the second imaging unit 14 to transmit the acquired around-the-eye feature information to the information processing apparatus 20. In this case too, the frame images of a moving image taken by the second imaging unit 14 are not transmitted to the information processing apparatus 20, so that the communication band between the head mounted display 10 and the information processing apparatus 20 can be saved.

In addition, in the embodiment mentioned above, user input information estimation processing is executed in the information processing apparatus 20; it is also practicable to execute user input information estimation processing in the head mounted display 10.

The present disclosure contains subject matter related to that disclosed in Japanese Priority Patent Application JP 2015-107815 filed in the Japan Patent Office on May 27, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A head mounted display apparatus to be mounted on a head of a user, comprising:
   a housing surrounding and supporting a display of the head mounted display apparatus, wherein the display is disposed in such a way as to be in a sight path of the user;
   an around-the-mouth imaging camera mounted at an underside of the housing and aimed at a mouth of the user at a position so as to image a mouth movement of the user; and
   a display control unit configured to display an image on the display to the user based on input information of said user estimated from the mouth movement imaged by said around-the-mouth imaging camera.

2. The head mounted display apparatus according to claim 1, further comprising:
   an around-the-eye imaging camera arranged at a position where it is practicable to image expression around eyes of said user, wherein
   said display control unit displays an image based on input information of said user estimated from said mouth movement imaged by said around-the-mouth imaging camera and the expression around said eyes imaged by said around-the-eye imaging camera.

3. The head mounted display apparatus according to claim 2, wherein
said around-the-eye imaging camera is capable of detecting a sight line of said user, and
said display control unit displays an image based on input information of said user estimated from said mouth movement, said around-the-eye expression, and information related with the sight line of said user detected by said around-the-eye imaging camera.

4. The head mounted display apparatus head mounted according to claim 1, further comprising a microphone configured to pick up voice uttered by said user.

* * * * *